April 27, 1937.  L. G. BATES  2,078,919
METHOD OF FORMING HOLLOW GLASSWARE
Filed Jan. 20, 1936
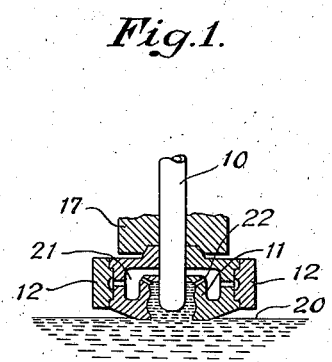
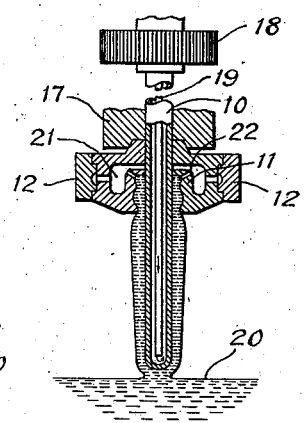
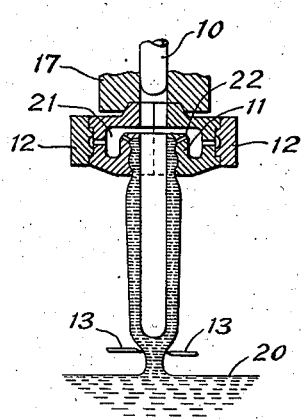
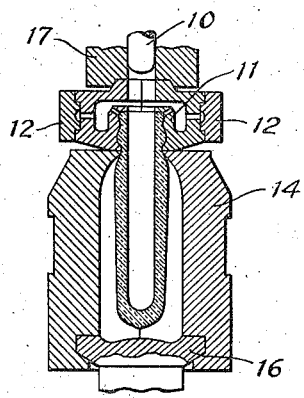
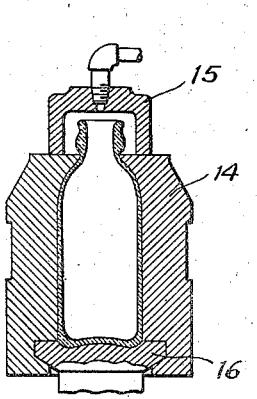
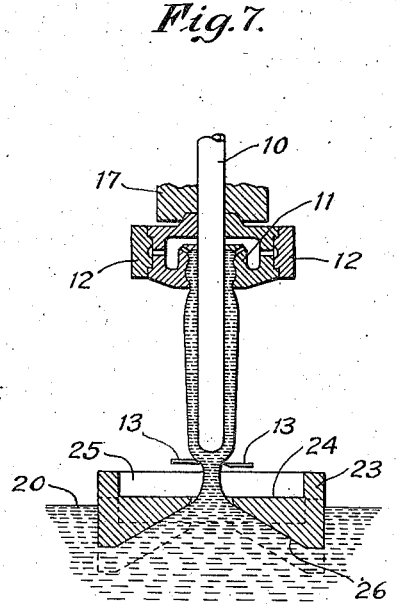
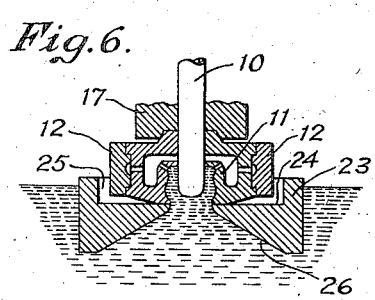
Witness:
A. A. Horn
Inventor:
Lloyd G. Bates
by Brown & Parham
Attorneys.

Patented Apr. 27, 1937

2,078,919

UNITED STATES PATENT OFFICE 2,078,919

METHOD OF FORMING HOLLOW GLASSWARE

Lloyd G. Bates, West Hartford, Conn., assignor to Hartford-Empire Company, Hartford, Conn., a corporation of Delaware Application January 20, 1936, Serial No. 59,834

5 Claims. (Cl. 49—80)

This invention relates to methods of forming hollow glassware and has particular relation to the formation of a hollow blank by drawing molten glass onto the surface of a former or plunger without the use of a mold, the blank then being blown to final shape in the usual way.

An object of the present invention is to provide a novel method of the above general character in which the walls of a hollow or tubular body are formed about a plunger or former above the glass supply pool without the necessity of immersing or dipping such plunger or former into the pool.

A more specific object of the present invention is to provide a novel method of the above character wherein a blank or hollow article is formed on a water-cooled former or plunger by holding the former or plunger above and out of appreciable contact with a pool of molten glass and drawing glass progressively upwardly around the former or plunger to form the body of the blank or hollow article.

Other objects of the invention will be pointed out in the detailed description thereof which follows or will be apparent therefrom or from the accompanying drawing wherein:

Figures 1 to 5 inclusive depict several steps of a preferred mode of performing the method; and Figs. 6 and 7 show two steps of a modification of the method shown in Figs. 1 to 5.

Referring in detail to the drawing, there have been shown a former or plunger 10, a neck ring or mold 11 mounted in holders 12, shears 13, a finishing mold 14 and blow head 15, with the usual bottom closure 16.

The plunger 10 and neck mold 11 preferably are assembled as a unit and so arranged that the neck mold may be raised upwardly along the plunger and both raised and lowered together as a unit. The plunger also preferably is rotatable relative to the neck mold, being mounted in a bearing shown partially at 17 and being provided with a pinion 18, for that purpose.

The plunger 10 is made hollow as shown, and contains a tube 19 which extends to the bottom of the interior of the plunger and serves as a water inlet pipe, the water flowing upwardly and out at the upper end of the plunger.

In the formation of a blank, the neck mold and plunger may be moved into the positions shown in Fig. 1, the neck mold contacting with the surface of the pool 20 and the plunger being positioned with its tip slightly above the level of the pool.

Vacuum is now applied to the neck mold through a vacuum chamber 21 in the neck mold and passages such as shown at 22 to fill the neck mold with glass and form the neck finish of the article being produced.

Then, while the plunger is held in approximately its original position, the neck mold is raised relative to the plunger and into its uppermost position as shown in Fig. 2. As a result of this operation, the glass is drawn upwardly around the plunger and is chilled thereby to provide a coating of plastic glass on the plunger.

During the upward movement of the neck mold or after completion of such movement, the plunger may be rotated or oscillated through pinion 18 to marver the interior of the glass and at the appropriate times, the plunger is retracted as shown in Fig. 3, and the neck mold is raised sufficiently to permit operation of shears 13 to sever the connecting tail, although the severing operation may be performed prior to or during withdrawal of the plunger if desired.

These operations leave a hollow blank suspended from the neck mold which is now transferred to the blow mold 14 and blown to final shape by blow head 15.

It will be understood that the novel method may be used for making articles other than blanks and that variations may be made in the above described procedure. The upward movement of the neck mold need not be continuous, but may be intermittent or the speed of upward movement varied. Also, the initial position of the plunger may be varied somewhat, as for example, by slightly immersing the tip of the plunger, or by holding it in a higher position for the gathering and forming operation.

Instead of directly contacting the neck mold with the surface of the pool as shown in Fig. 1, a refractory gathering ring 23, as shown in Figs. 6 and 7, may be employed. The neck mold may be moved downwardly into engagement with the top 24 of the ring within the recess 25 formed in the ring, the neck mold and ring then being moved downwardly until the top 24 of the ring is below the surface of the glass. This last movement may be accomplished with sufficient suddenness to force the glass upwardly into the neck ring without the application of vacuum, or if desired, vacuum may also be employed. The upward flow of the glass to the neck mold is aided by the conical shape of the bottom of the ring, as shown at 26 and by the head of glass above the level of the top 24 of the ring which results from gathering or drawing the glass in a plane below the surface of the pool.

After the neck mold is filled to form the finish, as shown in Fig. 6, it is elevated as before to draw the glass upwardly around the plunger 10 which is held stationary. Upward movement of ring 23 also is restrained until the neck ring and plunger are raised into or toward the severing position shown in Fig. 7, at which time the ring may be permitted to rise to the full line position of said Fig. 7. By holding the ring in its lower position the difference in level or head of the glass, which results, causes the glass to flow upwardly through the ring as the formation of the blank progresses, assisting in such formation. The shears then sever the tail and the blank is formed as described in reference to Figs. 1 to 5.

The neck mold and plunger are made of any suitable material which may be any one of various known special alloys which are resistant to high temperature and to the corrosive action of the glass.

It will be noted that the neck mold serves not only to receive and give external shape to the glass of the neck portion of a glass parison or other glass article, but also as a bait or drawing head to which the glass therein is attached so that the axial upward movement of such neck mold and of the glass therein relative to the plunger will draw glass from the supply pool in a hollow or tubular body, the walls of which, as formed, are chilled internally by the plunger and externally by the surrounding atmosphere and thus will be of substantial thickness throughout their length.

Any suitable mechanism may be provided for supporting and imparting to the neck ring and plunger the described relative and other bodily or operating movements. Such mechanism does not per se form part of the present invention and may be provided readily in various forms according to particular service requirements or preference. The shears and the other instrumentalities hereinbefore referred to likewise may be operated in any suitable way or by any suitable means. Thus, the gathering ring 23 conceivably might be kept in its lowered or depressed position for the time required by a manually operated implement, although in actual practice some form of automatic mechanism probably would be used for that purpose. Such a mechanism could be readily provided and might, for example, be generally similar to that shown in the patent to Wilzin, No. 1,297,981, granted March 18, 1919, for operating the glass conveying device 123 of that patent.

I claim:

1. The method of forming hollow articles which comprises gathering glass from the surface of a pool in a neck mold and about the tip of a water-cooled plunger confined in the neck mold, raising the neck mold relative to the plunger to draw glass upwardly around the plunger to form a hollow article thereon, turning the plunger in the article thus formed, and severing the tail of glass connecting the article and the molten glass in the pool.

2. The method of forming a hollow glass article having a neck portion at one end thereof which comprises moving a neck mold to a glass gathering position at the surface of a supply pool of molten glass, causing glass of the pool to fill said neck mold about the tip of a vertical former or plunger therein to form the neck portion of said article, moving said neck mold and the glass therein upwardly along the former or plunger to draw glass from the pool in the form of a hollow body surrounding said former, chilling the internal walls of said hollow body as formed, rotating the former or plunger in such hollow body, and severing said hollow body, when formed, from the supply glass of the pool.

3. The method of forming a hollow glass article which comprises causing glass to move upwardly from a supply pool of molten glass into an annular space in a vertically movable drawing head around the tip of a vertically disposed upwardly projecting former or plunger in said head, moving said head and the glass therein upwardly along said former or plunger to draw glass from the pool in the form of a tubular body on said former or plunger, rotating said former or plunger in contact with the inner surface of said tubular body, and separating said tubular body from the glass of the pool.

4. The method of forming an article of hollow glassware having a neck portion which comprises forming said neck portion of the article, by gathering glass from the surface of a supply pool in a neck mold around the tip of an upwardly projecting vertical former or plunger in said neck mold, forming a hollow parison body integral with said neck portion by moving said neck mold and the glass therein upwardly along said former or plunger to draw glass from the pool progressively upwardly in a tubular body surrounding the former or plunger and severing the glass of the tubular body from that of the pool, and thereafter introducing air under pressure through said neck portion into the hollow parison body to expand the latter to form the body of the final article.

5. The method of forming hollow glassware which comprises gathering glass from a body thereof in a neck mold about the tip of a water-cooled plunger held above but projecting into the cavity of said mold to form the neck finish for the article to be made, moving the neck mold along the plunger to draw glass from the supply body and to form a blank on the plunger, withdrawing the plunger from the blank, severing the connection between the blank and the glass in the pool, and blowing the blank to final form in a finishing mold.

LLOYD G. BATES.